US007345841B2

(12) United States Patent
Baugh et al.

(10) Patent No.: US 7,345,841 B2
(45) Date of Patent: Mar. 18, 2008

(54) DISK DRIVE USING A DISTURBANCE SENSOR FOR DISTURBANCE FREQUENCY-IDENTIFICATION AND SUPPRESSION

(75) Inventors: Eric Gordon Baugh, Portland, OR (US); Tetsuo Semba, San Jose, CA (US); Matthew T. White, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/349,774

(22) Filed: Feb. 7, 2006

(65) Prior Publication Data

US 2007/0183076 A1 Aug. 9, 2007

(51) Int. Cl.
*G11B 21/02* (2006.01)

(52) U.S. Cl. ..................................... 360/75; 360/77.04

(58) Field of Classification Search ..................... None
See application file for complete search history.

(56) References Cited

U.S. PATENT DOCUMENTS

| | | | | |
|---|---|---|---|---|
| 5,521,772 | A | 5/1996 | Lee et al. | |
| 5,663,847 | A | 9/1997 | Abramovitch | |
| 6,064,540 | A | 5/2000 | Huang et al. | |
| 6,487,028 | B1 * | 11/2002 | Sri-Jayantha et al. | 360/25 |
| 6,496,320 | B1 | 12/2002 | Liu | |
| 6,549,349 | B2 * | 4/2003 | Sri-Jayantha et al. | 360/31 |
| 6,567,231 | B1 | 5/2003 | Frees | |
| 6,594,106 | B1 | 7/2003 | Serrano et al. | |
| 6,710,966 | B1 | 3/2004 | Codilian et al. | |
| 6,934,117 | B2 * | 8/2005 | Huang et al. | 360/78.05 |
| 7,145,746 | B1 * | 12/2006 | Hirano et al. | 360/77.04 |
| 7,164,550 | B2 * | 1/2007 | Kisaka | 360/77.04 |
| 2003/0133218 | A1 | 7/2003 | Guo et al. | |
| 2004/0090698 | A1 | 5/2004 | Dang et al. | |
| 2006/0072392 | A1 * | 4/2006 | Semba et al. | 369/44.32 |
| 2006/0103970 | A1 * | 5/2006 | Kisaka | 360/77.08 |

OTHER PUBLICATIONS

Brown et al., "Identification of Periodic Signals with Uncertain Frequency," Proc of the American Control Conf, May 2002, pp. 1526-1531.

Regalia, "An Improved Lattice-Based Adaptive Notch Filter," IEEE Trans on Signal Processing, vol. 39, No. 9, Sep. 1991, pp. 2124-2128.

* cited by examiner

*Primary Examiner*—K. Wong
(74) *Attorney, Agent, or Firm*—Thomas R. Berthold

(57) ABSTRACT

A magnetic recording disk drive has a disturbance sensor and a disturbance frequency identifier that are used to adjust the frequency of a peak filter as the disturbance frequency changes. The sensor and the frequency identifier are separate from the servo control loop and thus do not rely on the head position error signal (PES) to predict the disturbance frequency. The adjustable peak filter is coupled in parallel with the servo feedback controller. The peak filter modifies the open loop transfer function and the error rejection function of the servo control loop to provide a higher rejection at the identified frequency. The peak filter may be switched out of or uncoupled from the servo feedback controller during track-seeking or as desired, depending on the amplitude of the sensor signal or the amplitude of the PES.

10 Claims, 5 Drawing Sheets

DISK DRIVE USING A DISTURBANCE SENSOR FOR DISTURBANCE FREQUENCY-IDENTIFICATION AND SUPPRESSION

BACKGROUND OF THE INVENTION

1. Field of the Invention

This invention relates generally to disk drives, and more particularly to a magnetic recording disk drive that includes a system for canceling the adverse effects of shock and vibration disturbances.

2. Description of the Related Art

Magnetic recording hard disk drives (HDDs) use an actuator, typically a rotary voice-coil-motor (VCM) actuator, for positioning the read/write heads on the data tracks of the recording disks. The HDD has a servo control system that receives a position error signal (PES) from servo positioning information read by the heads from the data tracks and generates a VCM control signal to maintain the heads on track (track "following") and move them to the desired track (track "seeking") for reading and writing of data.

HDDs experience disturbance forces during normal operation that affect the positioning of the heads on the data tracks. These disturbances may arise internally, such as from motion of the VCM actuator. Because HDDs are used in a variety of environments they are also subject to a wide range of external disturbances, such as from shocks to the HDD frame, movement of other HDDs when multiple HDDs are mounted together in a disk array system, or movement of other computer components, such as compact disk (CD) drives.

HDDs may have one or more other types of sensors, such as accelerometers and rotational vibration sensors, that provide measurements of the disturbances. The output of these types of sensors is often used for suspending operation of the HDD until the disturbance has subsided. The measured signal from these types of sensors may also be input to a feedforward controller to create a control signal that compensates for the head's off-track motion caused by the disturbance. This feedforward method works effectively when the disturbance is purely rotational vibration, for which the gain and the phase of the transfer function from the sensor output and the PES is known and does not change. However, head position is affected not only by rotational vibration, but also by various kinds of linear and rotational internal and external disturbances for which the feedforward method is less effective.

Many HDD disturbances exhibit narrow-band frequency characteristics, often at a single frequency. To compensate for narrow-band disturbances, peak filters are often used in the HDD servo control system, if the frequency of the disturbance is known. However, the frequency of the disturbance may not be known and/or may vary with time. For example, a compact disk (CD) drive in a computer housing varies its rotational speed as it starts and stops and as it accesses different portions of the CD. The vibrations due to the rotation of the CD may disturb the operation of the computer's HDD. These disturbances are typically at a single frequency (and perhaps harmonics of the primary frequency) that varies with time. Since there is no communication between the CD drive and the HDD, the frequency of the disturbance is unknown to the HDD's servo control system.

In co-pending application Ser. No. 10/956,972, filed Sep. 30, 2004, by the same inventors as this application and assigned to the same assignee, an HDD is described that uses a plurality of peak filters coupled to the servo control system. The peak filters can be separately enabled or disabled, and may be variable to adjust the peak filter frequency up or down, so as to suppress disturbances over a relatively wide range of frequencies.

What is needed is a HDD that can identify the frequency of a disturbance and adjust the frequency of a peak filter as the disturbance frequency changes to quickly suppress the disturbance.

SUMMARY OF THE INVENTION

The invention is a disk drive with a disturbance sensor and a disturbance frequency identifier that are used to adjust the frequency of a peak filter as the disturbance frequency changes. The sensor and the frequency identifier are separate from the servo control loop and thus do not rely on the PES to predict the disturbance frequency. The adjustable peak filter is coupled in parallel with the servo feedback controller. The peak filter modifies the open loop transfer function and the error rejection function of the servo control loop to provide a higher rejection at the identified frequency. The peak filter may be switched out of or uncoupled from the servo feedback controller during track-seeking or as desired, depending on the amplitude of the sensor signal or the amplitude of the PES.

For a fuller understanding of the nature and advantages of the present invention, reference should be made to the following detailed description taken together with the accompanying figures.

DETAILED DESCRIPTION OF THE INVENTION

Figure 1:
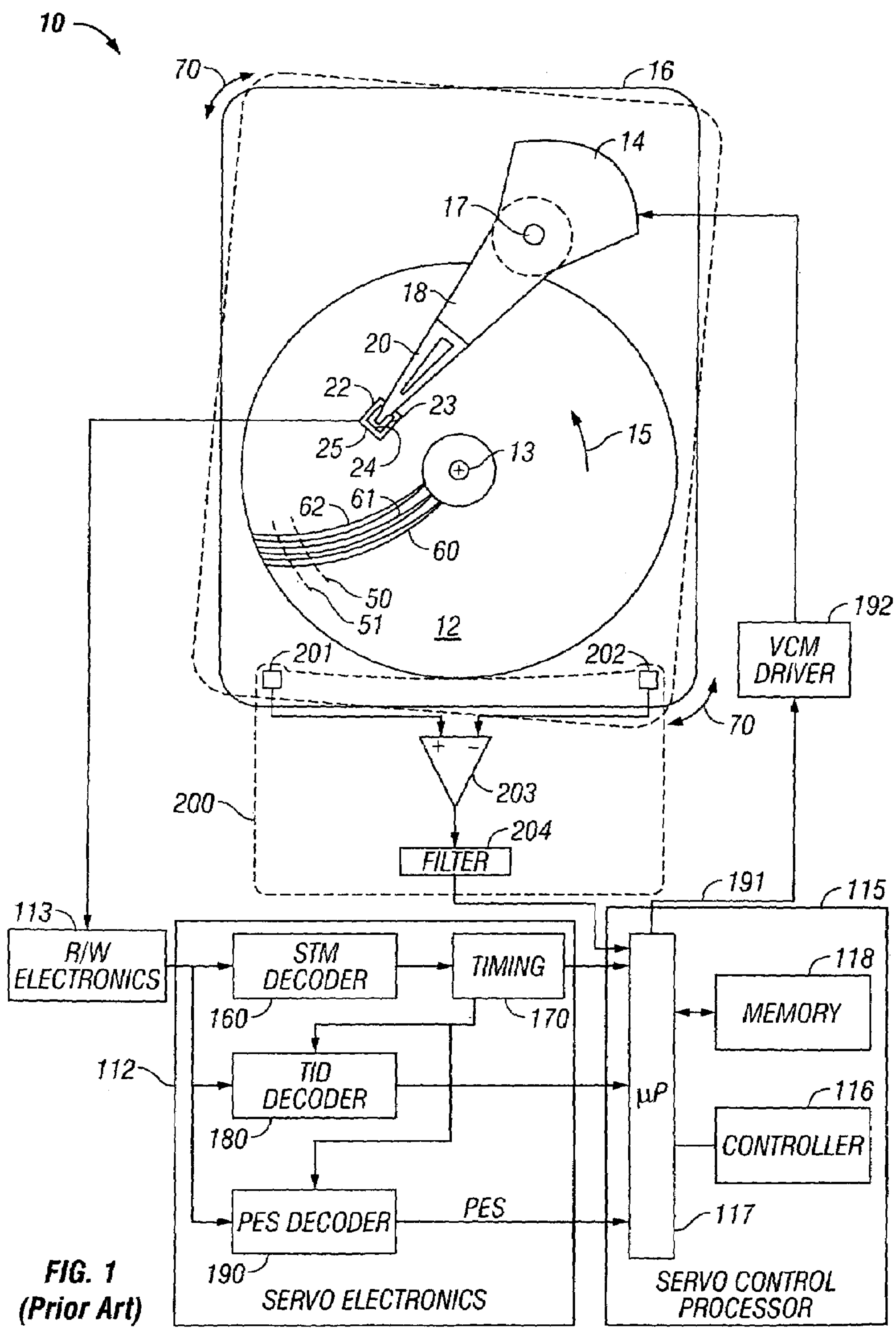
FIG. 1 is a schematic top view of a magnetic recording HDD with a rotational vibration (RV) sensor and feedforward compensation according to the prior art.

FIG. 1 is a block diagram of a prior art magnetic recording HDD 10 having a disturbance sensor 200. The disturbance sensor 200 is shown as a rotational vibration (RV) sensor for detecting rotational vibrations substantially in the plane of the disk 12. However, for the purpose of explanation of the present invention, the HDD may use any type of sensor, such as a single-axis or multi-axis accelerometer, for detecting disturbances other than purely rotational vibrations. In prior art HDDs with disturbance sensors, like the HDD shown in FIG. 1, the disturbance sensor may be used in a feedforward controller to provide a control signal summed with the VCM actuator control signal to compensate for the disturbance.

HDD 10 includes a magnetic recording disk 12 that is rotated about an axis of rotation 13 in direction 15 by a spindle motor (not shown) mounted to the HDD housing or base 16. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM) that indicates the start of the servo sector, a track identification (TID) code, and a portion of a pattern of magnetized blocks or high-frequency bursts that are decoded to provide a head position error signal (PES).

HDD 10 also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 113. The servo electronics 112 receives input from R/W electronics 113 and provides digital signals to servo control processor 115. The servo control processor 115 provides an output 191 to VCM driver 192 that controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 is a digital signal processor that includes a microprocessor 117 that uses the PES as input to a control algorithm to generate the control signal 191 to VCM driver 192. The control algorithm recalls from memory 118 a "controller" 116, which is a set of parameters based on the static and dynamic characteristics of the "plant" being controlled, i.e., the VCM 14. The control algorithm is essentially a matrix multiplication algorithm, and the controller parameters are coefficients used in the multiplication and stored in memory accessible by the microprocessor 117.

The HDD is subject to rotational disturbances, as shown by arrows 70, that arise both internally, such as from motion of the VCM 14, and externally. These disturbances cause track misregistration (TMR) of the read/write heads. The RV sensor 200 detects these rotational disturbances. RV sensor 200 may be a rotational accelerometer, shown as two linear accelerometers 201, 202, each attached to a respective side of base 16. The linear accelerometers 201, 202 are commercially available two-axis piezoelectric accelerometers, such as Murata Model PKGS-00LD accelerometers. The accelerometer is shown schematically as being attached directly to the base 16, but it may also be attached to a printed circuit board or card (not shown) that contains the HDD electronics, which is secured to the base 16. The rotational accelerometer may also be a single-piece angular accelerometer. Other types of rotational accelerometers are commercially available from STMicroelectronics and Delphi.

The difference in output of the two linear accelerometers 201, 202 is summed at differential amplifier 203, so that together the linear accelerometers and the differential amplifier 203 function as a rotational accelerometer. The output of differential amplifier 203 is passed through a conditioning filter 204 and then to microprocessor 117. The servo control processor 115 uses the signal from RV sensor 200 to cancel the off-track motion induced by rotational vibration through a feedforward control method that creates a compensation signal that is used to provide the input 191 to the VCM driver 192. The feedforward controller is calculated by the microprocessor 117 using parameters and program instructions stored in memory 118. It is well known in the art that the feedforward controller may also be implemented with analog circuitry that converts the signal from the RV sensor to the compensation signal, with the compensation signal then being summed with the control signal to the VCM driver 192 after the servo control processor has calculated the control signal.

Figure 2:
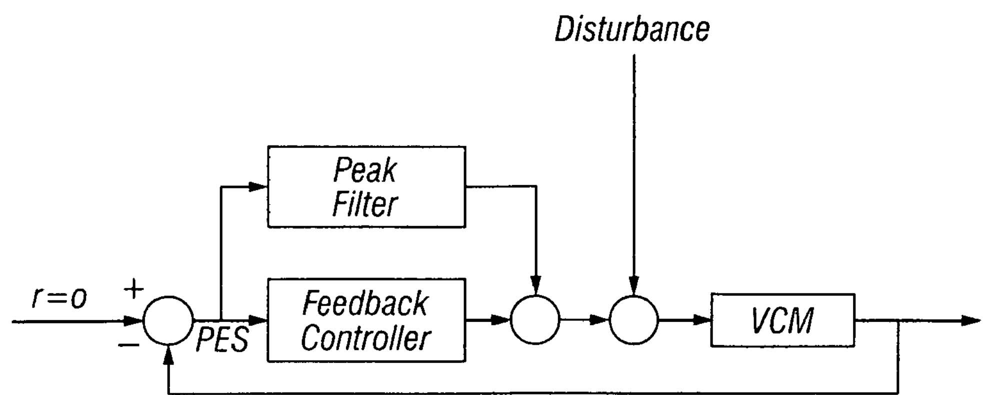
FIG. 2 is schematic diagram showing a conventional fixed single-frequency peak filter in a HDD servo control loop.

In prior art HDDs with disturbance sensors, like the HDD shown in FIG. 1, the disturbance sensor is typically used with a feedforward controller to provide a control signal summed with the VCM actuator control signal to compensate for the disturbance. However, other prior art HDDs do not have disturbance sensors and feedforward controllers, but rather use peak filters. Because many HDD disturbances exhibit narrow-band frequency characteristics, often at a single frequency, peak filters are often used in the HDD servo control system if the frequency of the disturbance is known. FIG. 2 shows the servo control loop for such an HDD, i.e., an HDD without a disturbance sensor and feedforward controller, but with a conventional fixed single-frequency peak filter. The peak filter is connected in parallel to the servo feedback controller for driving the VCM actuator. The peak filter is, for example, a second order filter that modifies the open loop transfer function and the sensitivity function (or error rejection function) of the control loop to provide a higher rejection at a particular frequency associated with the disturbance. The head position signal at the output of the VCM actuator is fed back via a feedback loop to be subtracted from the input to the feedback controller as the position error signal (PES). The PES is also an input to the peak filter.

However, the frequency of the disturbance may not be known and/or may vary with time. In such a case, a peak filter at a fixed single-frequency in the HDD servo control system would not be able to compensate for the unknown and/or time-varying disturbance.

While the typical use of a disturbance sensor in an HDD is as an input to a feedforward controller, as described above, in the present invention the disturbance sensor is used for identification of the disturbance frequency to adjust a peak filter. Peak filters are typically used at low frequencies where the accelerometer signal quality may not be sufficient for feedforward control, but still sufficient for frequency identification. Also, the peak filter frequencies are typically outside the range of frequencies where feedforward controllers are designed to operate, regardless of signal quality. Because it is difficult to design an acceleration feedforward algorithm that works well over all frequencies, it is typically designed for the most troublesome range of frequencies—for example, the mid-frequency range of disturbances found in disk arrays. It is likely that better disturbance rejection at the identified frequency will be achieved with a peak filter than with acceleration feedforward.

Figure 3:
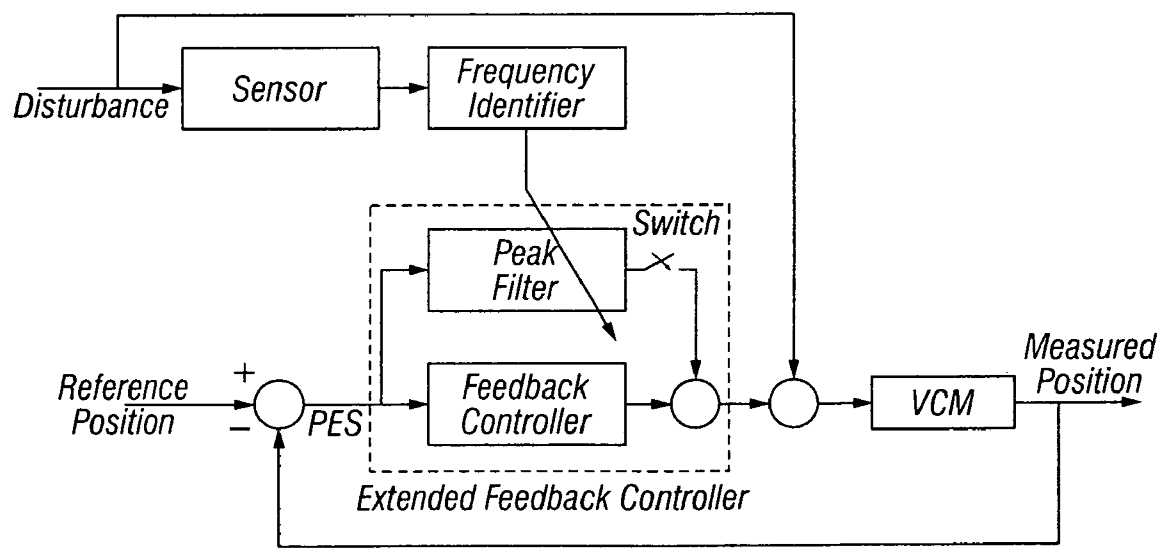
FIG. 3 is a servo control loop for a HDD according to the invention and illustrates an adjustable peak filter connected in parallel to the servo feedback controller and a frequency identifier that adjusts the frequency of the peak filter in response to a signal from a disturbance sensor.

FIG. 3 shows the servo control loop for a HDD according to the present invention. An adjustable peak filter is connected in parallel to the servo feedback controller for driving the VCM actuator. The output of a disturbance sensor is input to a frequency identifier, which selects the frequency of the adjustable peak filter. The disturbance sensor may be a RV sensor, a single-axis or multi-axis accelerometer, or any type of sensor for detecting shocks or disturbances to the HDD. For example, some HDDs may use a specific type of shock sensor that is not used with a feedforward controller but only to provide a write inhibit signal, and the signal from this type of sensor can provide the signal necessary for the frequency identification.

The frequency identifier identifies the frequency of the disturbance from the sensor signal and selects this frequency as the peak filter frequency for the adjustable peak filter. The frequency identifier may be implemented in analog circuitry but is preferably one of a number of known frequency identification algorithms that can be run by the HDD's servo control processor. Examples of frequency identification algorithms that can identify the unknown frequency of a disturbance if a signal is available for measurement are described by Regalia, "An Improved Lattice-Based Adaptive Notch Filter," *IEEE Trans on Signal Processing*, Vol. 39, No. 9, September 1991, pp. 2124-2128; and Brown et al., "Identification of Periodic Signals with Uncertain Frequency," *Proc of the American Control Conf*, May 2002, pp. 1526-1531.

Figure 4:
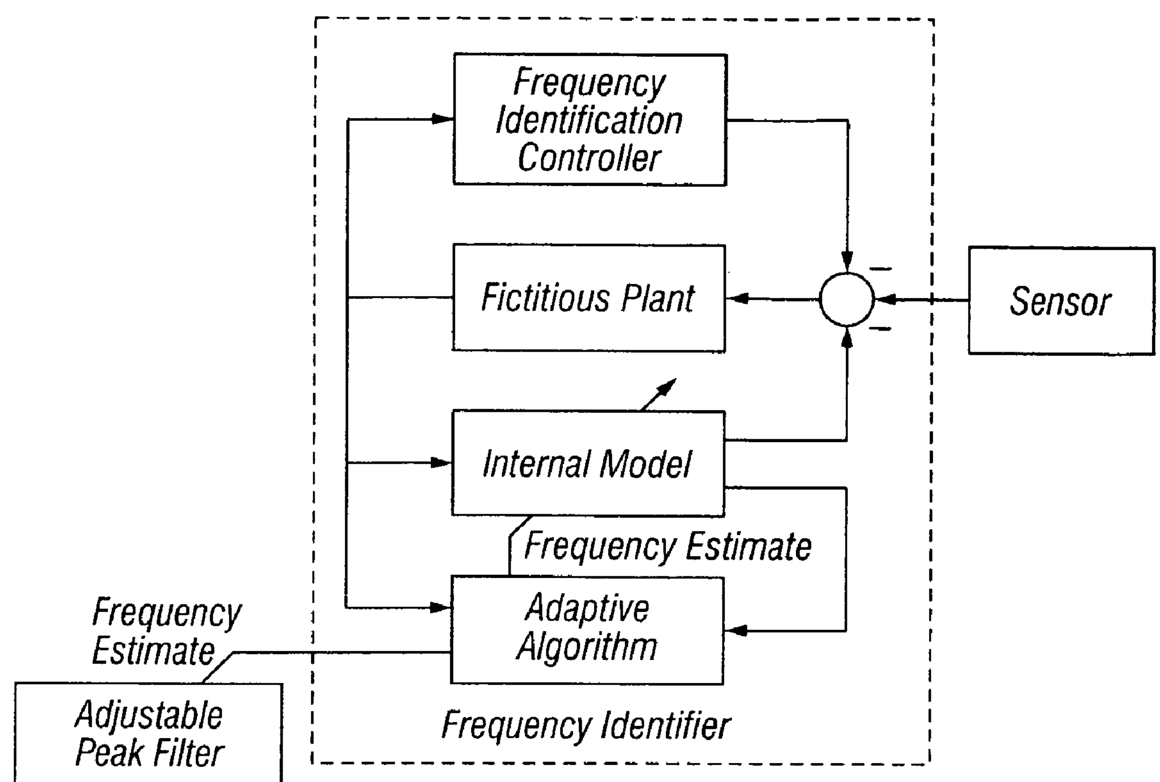
FIG. 4 is a control block diagram illustrating the frequency identification algorithm that may be used to adjust the frequency of the adjustable peak filter.

FIG. 4 is a control block diagram illustrating the frequency identification algorithm described by Brown et al. that may be used to adjust the frequency of the adjustable peak filter. The Brown algorithm is a continuous-time algorithm. Typically, HDDs use discrete-time controllers. The algorithm of Brown et al. is appropriate for frequency identification in discrete-time HDD controllers after conversion to a discrete-time algorithm.

This algorithm has four parts: a fictitious plant, a frequency identification controller, an internal model of the disturbance, and an adaptive algorithm that adjusts the frequency estimate of the disturbance. The fictitious plant is a low pass filter with a cut-off frequency that is higher than the highest possible disturbance frequency. The frequency identification controller contains an integrator to remove any DC component of the sensor signal and maintains stability of the frequency identification feedback loop. The internal model is a sinusoid with an adjustable frequency. The adaptive algorithm is a recursive form of least-squares adaptation.

Figure 5:
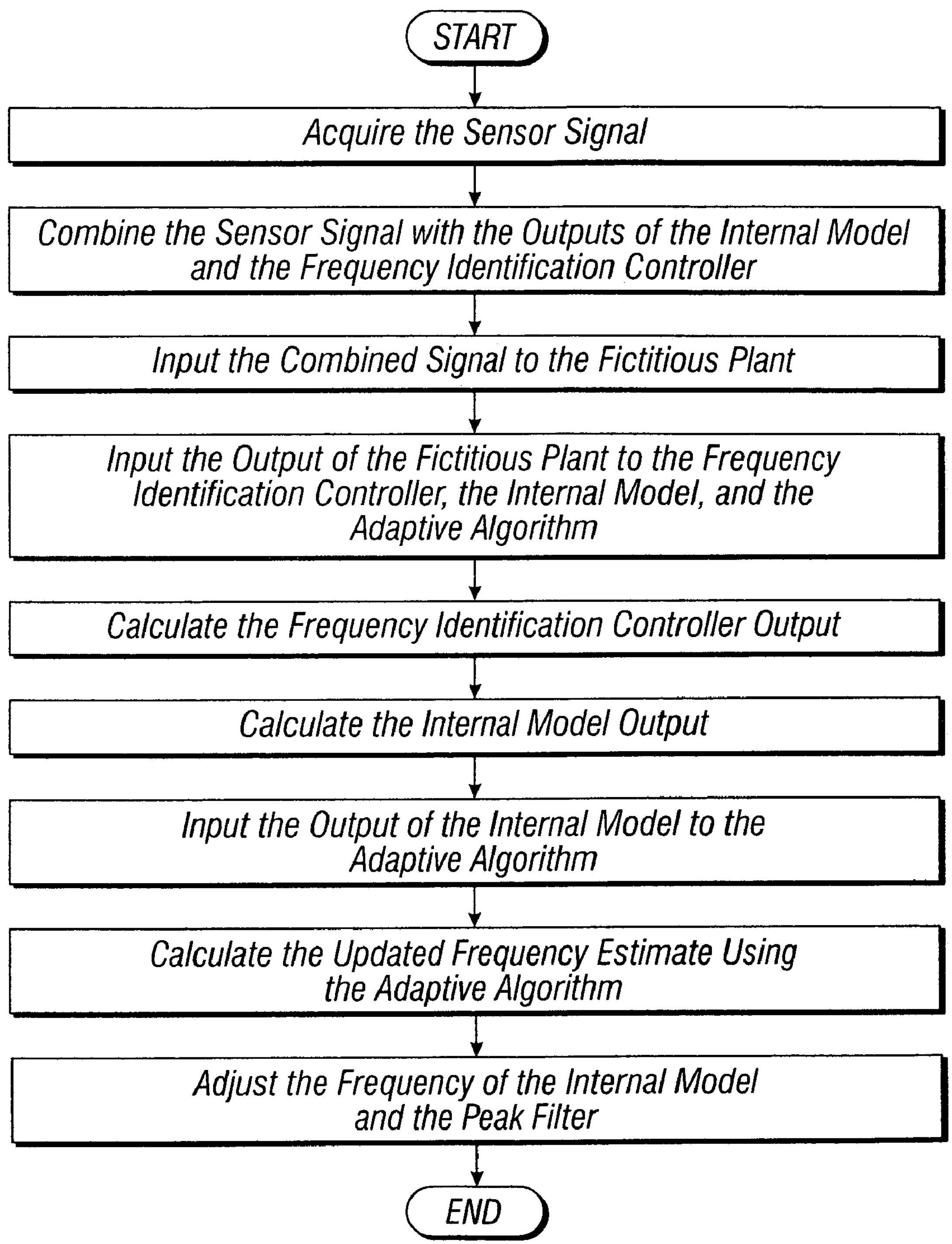
FIG. 5 is a flow chart of the method for adjusting the frequency of the peak filter from the sensor signal.

The sensor signal, controller output, and internal model output are fed into the fictitious plant. The output of the fictitious plant is input to the frequency identification controller and the internal model, so that the frequency identification controller and the internal model are acting in parallel to each other and in feedback to the fictitious plant. Based on the states of the internal model and the output of the plant, the estimate of the disturbance frequency is adjusted by the adaptive algorithm for both the internal model and the peak filter. FIG. 5 is a flow chart of the method described by Brown et al. for adjusting the peak frequency of the peak filter from the sensor signal.

Figure 6A:
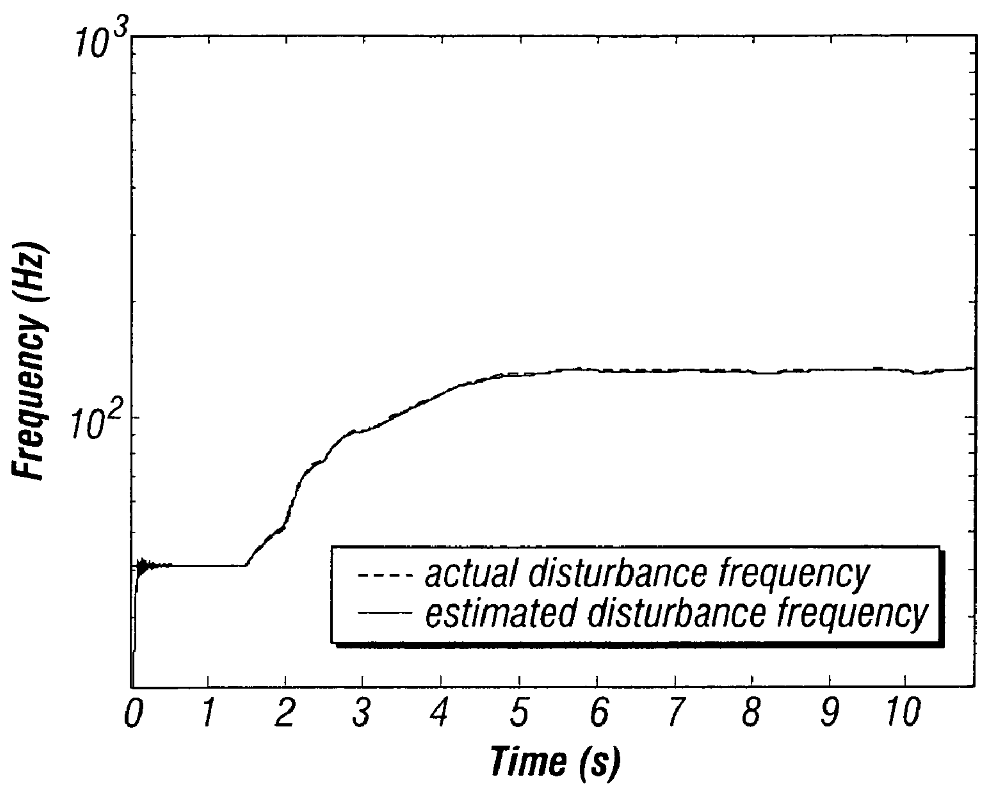
FIG. 6A shows the estimated disturbance frequency, compared to the actual disturbance frequency, of a simulated input signal using the method of the invention.
Figure 6B:
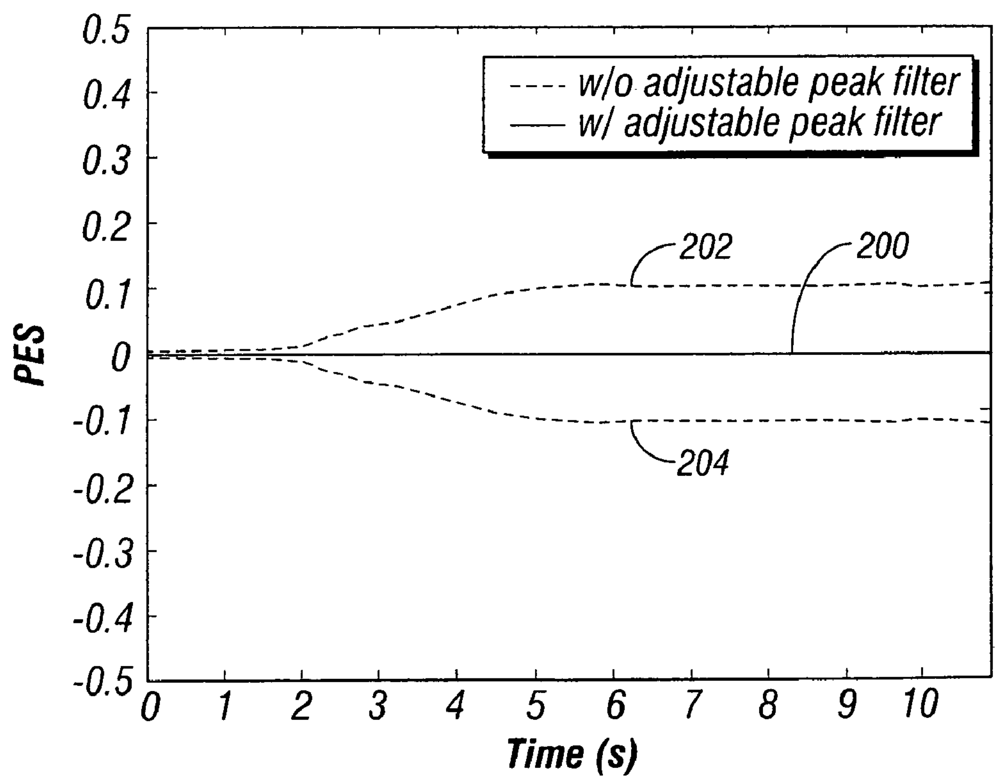
FIG. 6B shows the PES without a peak filter, compared to the PES according to the invention, for the simulated disturbance of FIG. 6A.

The invention was simulated using the frequency identification algorithm of Brown et al. An input signal that approximated the frequency of a CD drive as it spins up was generated. FIG. 6A shows the estimated frequency of the disturbance calculated by the frequency identification algorithm, compared to the actual value. The initial error and oscillations at time zero are the result of the algorithm starting with an estimated frequency of near zero. Better performance can be achieved with a more accurate initial estimate of the disturbance frequency. FIG. 6B shows the PES without a peak filter compared to the results with the adjustable peak filter according to the invention. The changing value of the disturbance is identified very rapidly as it sweeps over its frequency range and significant disturbance rejection is achieved with the adjustable peak filter, so that the disturbance has essentially no effect on the PES, as shown by the essentially straight line 200 in FIG. 6B. In contrast, without the adjustable peak filter, the PES oscillates rapidly between values represented by traces 202, 204.

The peak filter may be switched out of or uncoupled from the feedback controller, as shown in FIG. 3 by the switch at the output of the adjustable peak filter. It is often desirable to turn the peak filter off during track-seeking mode, i.e., when the VCM actuator is moving the head from one track to another track. The peak filter provides additional disturbance rejection at a single frequency, which is important for high-precision track-following but is typically not a concern for track-seeking. The peak filter may be also switched off depending on the amplitude of the sensor signal or the amplitude of the PES. Since the peak filter is part of the feedback loop, the additional disturbance rejection achieved by the peak filter results in degraded disturbance rejection at other frequencies. Since the peak filter is placed at a frequency that has a large disturbance, and hopefully the degraded disturbance rejection can be placed at frequencies without large amplitude disturbances, the tradeoff is typically favorable. However, if a very small amplitude disturbance is detected at the peak filter frequency, better overall performance may be achieved by turning off the peak filter.

The present invention simplifies design of both the PES feedback loop and the determination of the peak filter frequency. Because the peak filter frequency determination is not part of the feedback loop, it does not cause stability issues that might arise if the PES were used to identify the peak filter frequency. The frequency identification algorithm can be turned on and off without affecting the PES feedback loop.

Because the HDD according to the present invention uses a separate sensor which is specifically designed to measure disturbances, a better signal is available to identify the frequency of the disturbance. The sensor signal does not include track misregistration effects such as actuator resonances or disk modes and thus provides easier identification of the disturbance frequency. Also, the identification of the disturbance frequency is faster since the sensor measures the disturbance effects directly without the time delays associated with waiting for the disturbance effects to appear in the PES.

The invention may be implemented in firmware or software, and stored in a computer-readable storage medium, such as memory associated with the processor, for execution as program steps by the processor.

The invention has been described as implemented in a magnetic recording HDD. However, the invention is applicable to other types of disk drives, such as optical disk drives, for example, CD and digital versatile disk (DVD) types of read-only and writable disk drives, that use optical disks and optical read or read/write heads.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:

a rotatable disk having a plurality of tracks containing positioning information;

a head movable across the disk, the head being capable of reading positioning information in the tracks;

an actuator for moving the head;

a sensor for sensing a disturbance to the disk drive;

a feedback controller providing a controller output as an actuator input to drive the actuator;

a feedback loop to feed a head position at an output of the actuator as an input back to the controller to produce a position error signal (PES);

an adjustable peak filter coupled to the feedback controller; and a frequency identifier coupled to the sensor for identifying the frequency of a disturbance detected by the sensor, the frequency identifier output being input to the adjustable peak filter to select the frequency of the peak filter; whereby the influence of the disturbance on the actuator at the identified frequency is substantially suppressed.

2. The disk drive of claim 1 wherein the disk drive is a magnetic recording disk drive and the disk is a magnetic recording disk having a plurality of concentric data tracks containing servo positioning information.

3. The disk drive of claim 1 wherein the adjustable peak filter is uncoupled from the feedback controller when the actuator is moving the head from one track to another track.

4. The disk drive of claim 1 wherein the frequency identifier comprises a fictitious plant for generating a low-pass filter with a cut-off frequency higher than the highest expected frequency of the disturbance, a frequency identification controller for removing DC components of the sensor signal, and an internal model for generating a sinusoid with an adjustable frequency, and wherein the sensor signal, the output of the frequency identification controller and the output of the internal model are input to the fictitious plant.

5. A magnetic recording disk drive, the disk drive including (a) a rotatable magnetic recording disk having a plurality of concentric data tracks containing servo positioning information; (b) a recording head movable across the disk, the head being capable of reading data and servo positioning information in the data tracks; (c) an actuator for moving the head; (d) a sensor for sensing a disturbance to the disk drive; (e) a processor for receiving a position error signal (PES) from the servo positioning information and a signal from the sensor and for generating an actuator control signal to the actuator; and (f) memory coupled to the processor and containing a program of instructions readable by the processor for undertaking acts comprising:

identifying, from the sensor signal, the frequency of a disturbance to the disk drive;

selecting said identified frequency as the frequency of a peak filter; and calculating, from the PES and the peak filter, the actuator control signal in the presence of a disturbance to the disk drive at said identified frequency.

6. The disk drive of claim 5 wherein the program of instructions includes instructions for undertaking the act of calculating the actuator control signal without the peak filter.

7. The disk drive of claim 5 wherein the program of instructions includes a fictitious plant program for generating a low-pass filter with a cut-off frequency higher than the highest expected frequency of the disturbance, a frequency identification controller for removing DC components of the sensor signal, and an internal model program for generating a sinusoid with an adjustable frequency; and wherein undertaking the act of identifying the frequency of a disturbance to the disk drive includes the act of inputting to the fictitious plant the sensor signal, the output of the frequency identification controller and the output of the internal model.

8. A processor-implemented method for operating a disk drive, the disk drive including (a) a rotatable magnetic recording disk having a plurality of concentric data tracks containing servo positioning information; (b) a recording head movable across the disk, the head being capable of reading data and servo positioning information in the data tracks; (c) an actuator for moving the head; (d) a sensor for sensing a disturbance to the disk drive; (e) a processor for receiving a position error signal (PES) from the servo positioning information and a signal from the sensor and for generating a actuator control signal to the actuator; and (f) memory coupled to the processor and containing a program of instructions readable by the processor, the program including an actuator feedback controller, a frequency identifier, and a peak filter; the processor-implemented method comprising:

calculating, from the PES and the actuator feedback controller, the actuator control signal in the absence of a disturbance to the disk drive;

calculating, from the sensor signal and the frequency identifier, the frequency of a disturbance to the disk drive;

selecting said calculated frequency as the peak frequency of said peak filter; and calculating, from the PES, the actuator feedback controller, and the peak filter, the actuator control signal in the presence of a disturbance to the disk drive at said frequency.

9. The method of claim 8 further comprising, when the actuator is moving the head from one track to another track, not using the peak filter during the calculation of the actuator control signal.

10. The method of claim 8 wherein the frequency identifier comprises a fictitious plant having a low-pass filter with a cut-off frequency higher than the highest expected frequency of the disturbance, a frequency identification controller having an integrator for removing DC components of the sensor signal, and an internal model having a sinusoid with an adjustable frequency; and wherein calculating the frequency of a disturbance comprises inputting to the fictitious plant the sensor signal, the output of the frequency identification controller and the output of the internal model.

* * * * *